United States Patent [19]

Kanno et al.

[11] Patent Number: 4,854,285

[45] Date of Patent: Aug. 8, 1989

[54] ELECTRONIC CONTROL CIRCUIT FOR INTERNAL-COMBUSTION ENGINES

[75] Inventors: Yoshiaki Kanno; Ryoji Nishiyama, both of Hyogo, Japan

[73] Assignee: Mitsubishi Denki Kabushiki Kaisha, Tokyo, Japan

[21] Appl. No.: 133,889

[22] Filed: Dec. 16, 1987

[30] Foreign Application Priority Data

Dec. 17, 1986 [JP] Japan ................................. 61-301988

[51] Int. Cl.$^4$ .............................................. F02D 9/02
[52] U.S. Cl. ..................................... 123/418; 123/422
[58] Field of Search .................... 123/339, 418, 422

[56] References Cited

U.S. PATENT DOCUMENTS

| | | |
|---|---|---|
| 4,259,723 | 3/1981 | Fujisawa et al. . |
| 4,337,512 | 6/1982 | Furuhashi . |
| 4,377,996 | 3/1983 | Yamaguchi . |
| 4,626,997 | 12/1986 | Takeda et al. ................ 123/422 X |
| 4,697,563 | 10/1987 | Becker et al. ................. 123/339 X |
| 4,714,064 | 12/1987 | Imazu ........................... 123/418 X |

FOREIGN PATENT DOCUMENTS

145332  7/1986  Japan .

*Primary Examiner*—Tony M. Argenbright
*Attorney, Agent, or Firm*—Bernard, Rothwell & Brown

[57] ABSTRACT

An electronic control device for internal-combustion engines in which, when the engine has begun a slow-speed hunting state, the ignition timing is changed from the first ignition timing to the second ignition timing; and when the slow-speed hunting state is released, the ignition timing is changed from the second ignition timing to the first ignition timing; and this ignition timing, when changed, gradually varies.

7 Claims, 6 Drawing Sheets

ELECTRONIC CONTROL CIRCUIT FOR INTERNAL-COMBUSTION ENGINES

BACKGROUND OF THE INVENTION

1. Field of the Invention

This invention relates to an electronic control device for internal-combustion engines and more particularly to an electronic control circuit adapted to realize driving stability without slow-speed hunting during travel at a low vehicle speed wth a throttle valve in a fully closed operating point.

2. Description of the Prior Art

Generally, in a motor vehicle travelling at a low speed with a throttle valve at a fully closed operating point, there takes place unpleasant low-frequency vibration caused by the rotation of an engine and accompanying longitudinal vibration of the motor vehicle. This is termed slow-speed hunting.

Figure 1:
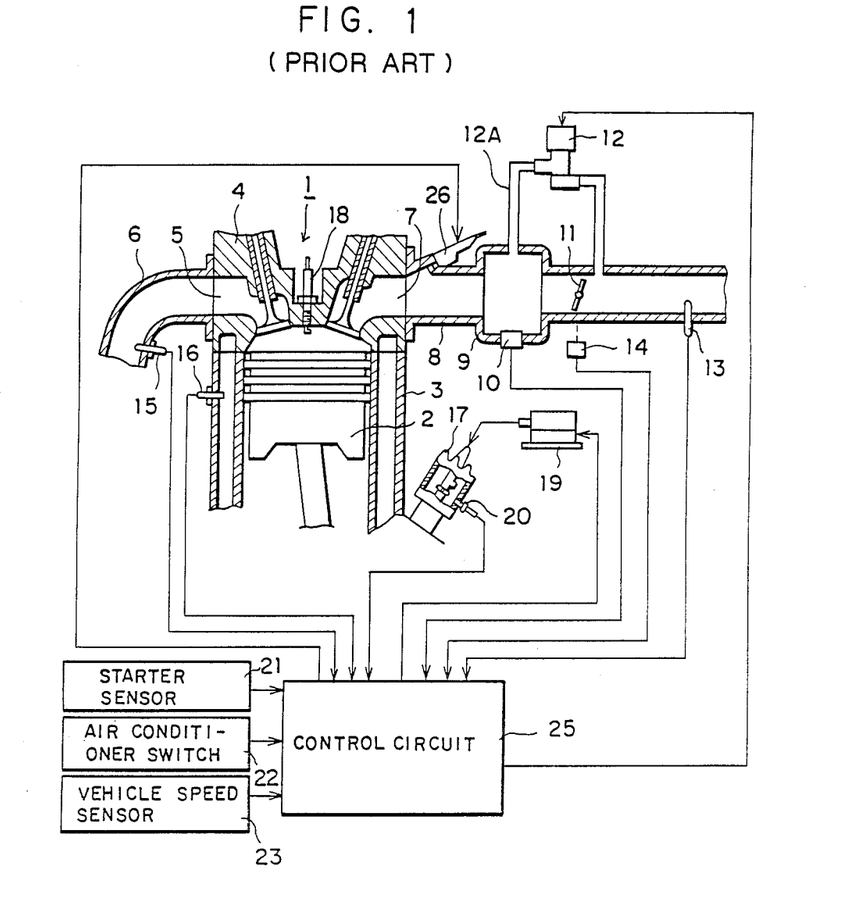
FIG. 1 is a block diagram showing a conventional electronic control device for internal-combustion engines.

FIG. 1 shows an electronic control device for internal-combustion engines. Referring to FIG. 1, prior-art devices (for example Laid-Open Japanese Pat. No. Sho 61-145332) will be described. In this drawing, 1 is an engine; 2 is a piston; 3 is a cylinder; and 4 is a cylinder head. To an exhaust port 5 of each cylinder of the cylinder head, an exhaust manifold 6 is connected; and to an intake port 7, an intake manifold 8 is connected. In the intake manifold 8 a surge tank 9 is provided to prevent intake air pulsation; and in the surge tank 9 an intake pressure sensor 10 is provided to sense a pressure, or an intake pipe pressure Pm, in the intake manifold 8. A numeral 11 is a throttle valve which controls the quantity of intake air to be fed into each cylinder through the surge tank 9; 12 is an idle speed control valve (ISCV) which controls the quantity of intake air flowing through a bypass passage 12A bypassing the throttle valve 11; and 13 is an intake temperature sensor which senses intake air temperature. To the throttle valve 11 is directly connected a throttle position sensor 14 having a throttle valve opening sensor which outputs a signal in accordance with the amount of its opening and an idle switch which is on when the engine 1 is idling. A numeral 15 is an oxygen concentration sensor which is mounted in the exhaust manifold 6 to sense oxygen concentration in exhaust gases; 16 is a water temperature sensor which senses cooling water temperatures of the engine 1; 17 is a distributor which applies a high voltage output from an igniter 19 at a specific timing to an ignition plug 18 of the engine 1; 20 is a speed sensor which is mounted in the distributor 17 and gives off a pulse signal correspondingly to the number of revolutions Ne of the engine 1; 21 is a starter sensor which senses the operating condition of a starting motor not illustrated which starts the engine 1; 22 is an air conditioner switch which senses the operating condition of a compressor for an air conditioner and 23 is a vehicle speed sensor which is mounted on a driven wheel for sensing the running condition of a motor vehicle and senses its number of revolutions.

Various sensing signals from the aforementioned intake air pressure sensor 10, intake air temperature sensor 13, throttle position sensor 14, oxygen concentration sensor 15, water temperature sensor 16 and speed sensor 20 are output to a control circuit 25, by which various controls such as the control of the quantity of fuel injected from the fuel injection valve 26 and the control of the injection timing of the spark plug 18 are effected according to the aforementioned sensing signals.

Figure 2:
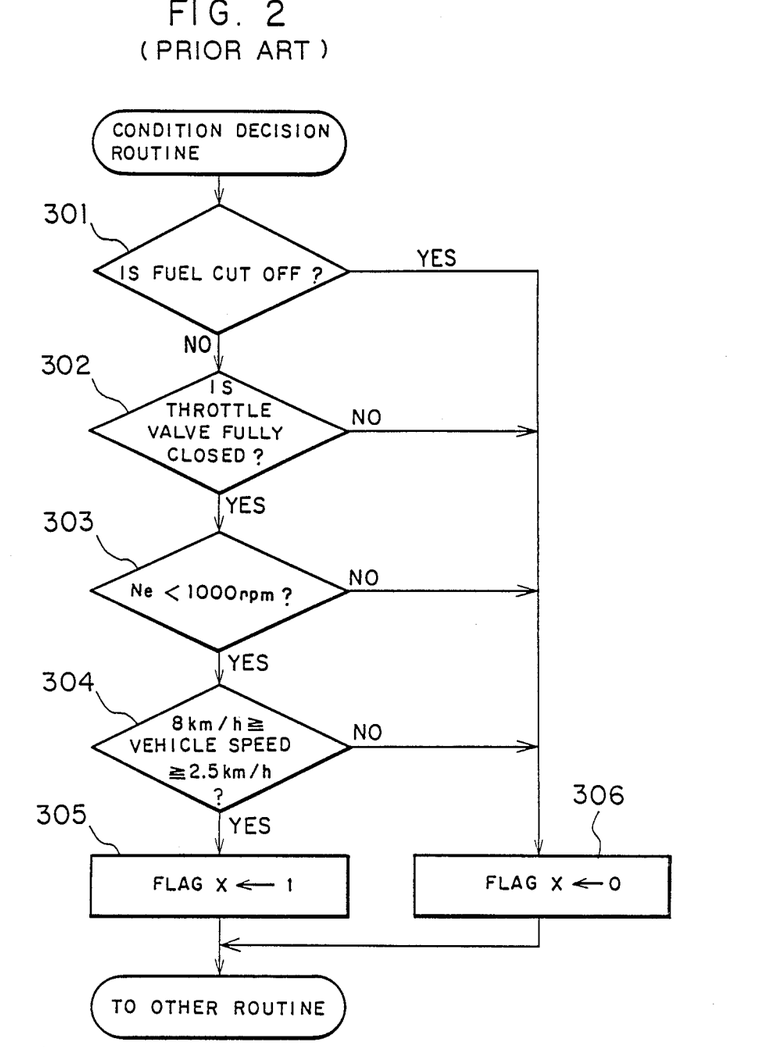
FIGS. 2 and 3 are flowcharts showing the operation of the conventional device described above.

Next, the operation of the prior-art device described above will be explained by referring to the flowcharts of FIGS. 2 and 3. FIG. 2 shows a program for sensing a slow-speed hunting state of a motor vehicle, that is, unpleasant low-frequency vibration caused by the rotation of the engine 1 and longitudinal vibration of the motor vehicle taking place along with it. This routine is executed by a CPU in the control circuit 25 by each specific number of revolutions of the engine 1 or by each specific time. First, at Step 301, a decision is made on whether or not the fuel is cut off; at Step 302, a decision is made on whether or not the throttle valve 11 is fully closed; at Step 303, a decision is made on whether or not the number of revolutions of engine Ne is below the specific value (1000 rpm); and at Step 304, a decision is made on whether or not the vehicle is travelling at a slow speed; each by using the output of the throttle position sensor 14, the speed sensor 20, and the vehicle speed sensor 23. The above-mentioned conditions decided will be established and the condition decision routine will proceed to Step 305 when fuel injection is being effected, the throttle valve 11 is fully closed, the number of revolutions Ne is Ne<1000 (rpm), and when the vehicle is travelling at a slow speed of over 2.5 km/h and under 8 km/h. At Step 305, the flag X is set at "1" to indicate the decision of the conditions. On the contrary, if any one of the aforementioned conditions is not decided, the routine proceeds to Step 306, and the flag X will be reset to "0".

After the sensing of a slow-speed hunting state by the decision routine in FIG. 2, the following processing is carried out on the basis of a result of flag X setting.

Figure 3:
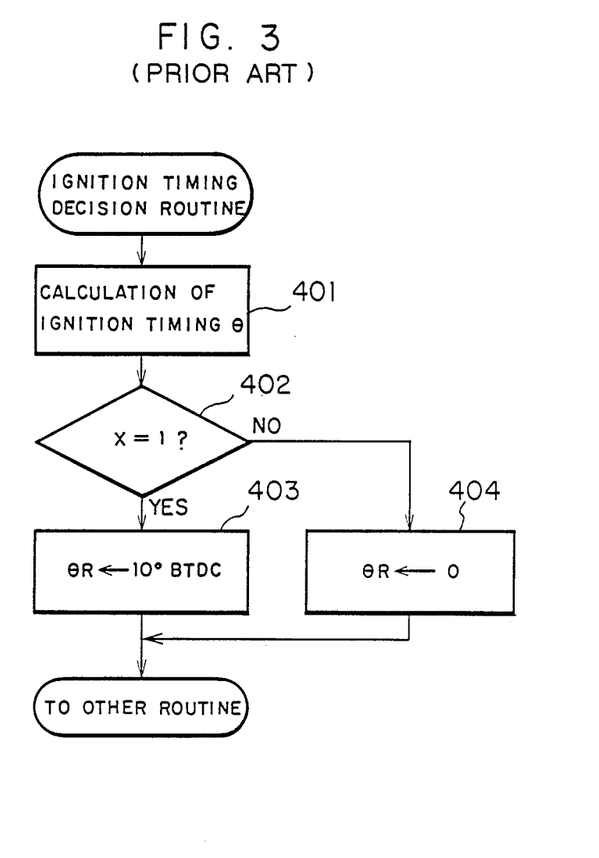

The routine shown in FIG. 3 is performed by the control circuit 25 by producing a control power to the igniter 19 prior to causing the spark plug 18 to produce a spark. First, Step 401 is executed, operating and computing the ignition timing $\theta$ presumed to be optimum for the engine 1 through ordinary ignition timing control on the basis of the output of various sensors shown in FIG. 1. Next, at Step 402, the decision of the flag X is accomplished; when the flag X is "1", proceed to Step 403, where a specific ignition timing (in this case, 10° BTDC) is stored to the value $\theta$R of the ignition timing to be actually executed. Thus, a signal to be output to the igniter 19 is as to be equal to the value $\theta$R, is controlled by the ignition execution routine not illustrated which the control circuit 25 executes at a specific crank angle. On the other hand, when the flag X is "0", proceed to Step 404, where the ignition timing $\theta$ determined by such parameters as the intake air pressure Pm computed at Step 401 and the number of revolutions of engine Ne is stored, as it is, to $\theta$R.

As described above, when the flag X is "1", the ignition timing is fixed at 10° BDTC without regard to the running state of the engine 1. Repeating the above-mentioned operation restrains rotational variation to prevent slow-speed hunting.

Conventional electronic control devices for internal-combustion engines are of the constitution described above, and have such a problem that when the engines have been judged to be in a slow-speed hunting state, the ignition timing is fixed at 10°, and if the slow-speed hunting condition is not satisfied, the ignition timing $\theta$ is adopted, and therefore the ignition timing will suddenly vary, giving a shock to the motor vehicle.

SUMMARY OF THE INVENTION

The present invention has been accomplished in an attempt to solve the aforementioned problem, and accordingly it is an object of the present invention to provide an electronic control device for internal-combustion engines adapted to prevent giving a shock to the motor vehicle when changing the ignition timing to restrain the slow-speed hunting.

The electronic control device for internal-combustion engines of this invention has a means to gradually change the ignition timing when changing the ignition timing, in order to attain the object described above.

Other objects and advantages of this invention will become more apparent from the following detailed description of the preferred embodiment when read in connection with the accompanying drawings.

BRIEF DESCRIPTION OF THE DRAWINGS

FIGS. 6(a–d) are an ignition timing chart explaining the ignition timing of the device of the aforementioned embodiment.

PREFERRED EMBODIMENT OF THE INVENTION

A preferred embodiment of this invention will now be described by referring to the accompanying drawings. The constitution of the electronic control device is the same as FIG. 1.

Figure 4:
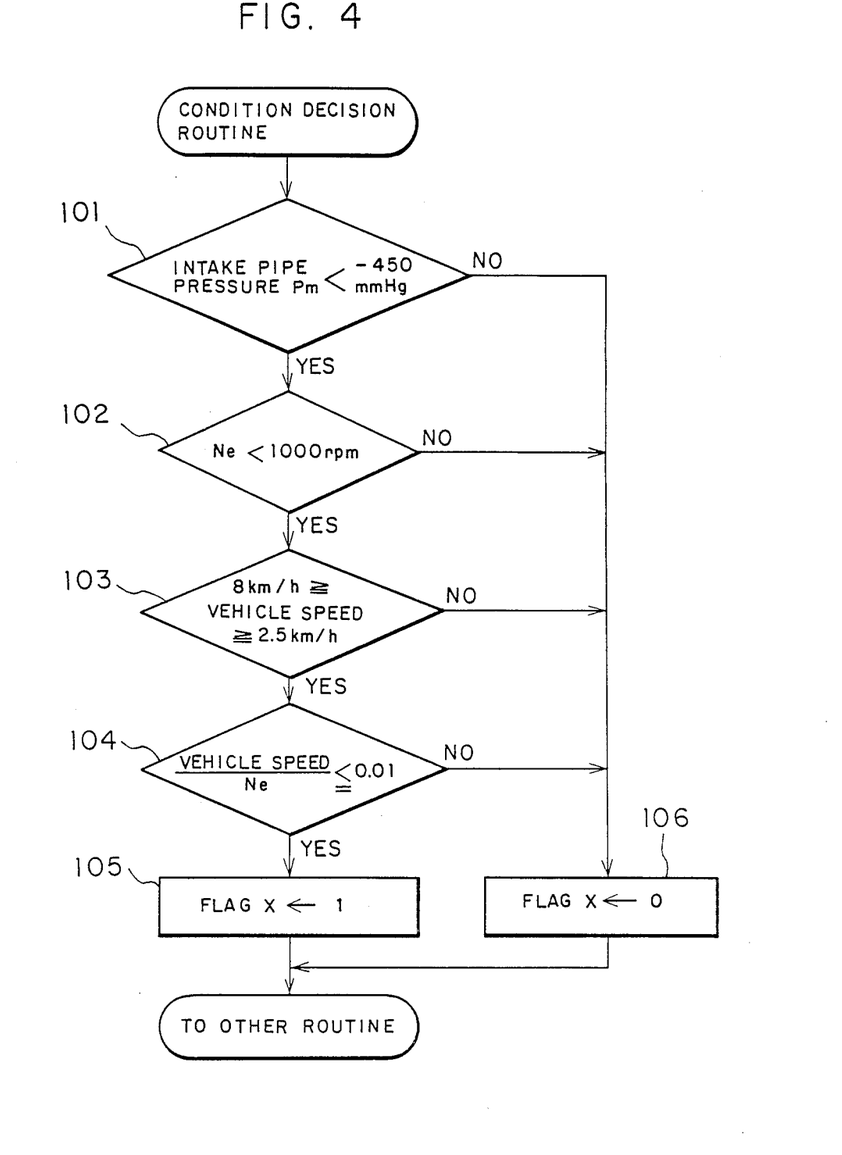
FIGS. 4 and 5 are flowcharts explaining one embodiment of the electronic control device for internal-combustion engines of this invention.

Next, its operation will be described by referring to the flowcharts of FIGS. 4 and 5. FIG. 4 shows a slow-speed hunting state decision routine. At Step 101, a decision is made on whether or not the intake pipe pressure Pm is $-450$ mmHg or less; at Step 102 a decision is made on whether or not the number of revolutions of engine Ne is 1000 rpm or less; at Step 103, a decision is made on whether or not the vehicle speed is 2.5 km/h or more and 8 km/h or less; and at Step 104, a decision is made on whether or not a ratio between the vehicle speed and the number of revolutions Ne is 0.01 or less (whether the gears are in the 1st speed). When each of the aforesaid conditions are satisfied, a slow-speed mode is judged, setting the flag X to "1" at Step 105. In other cases the flag X is set to "0" at Step 106.

Figure 5:
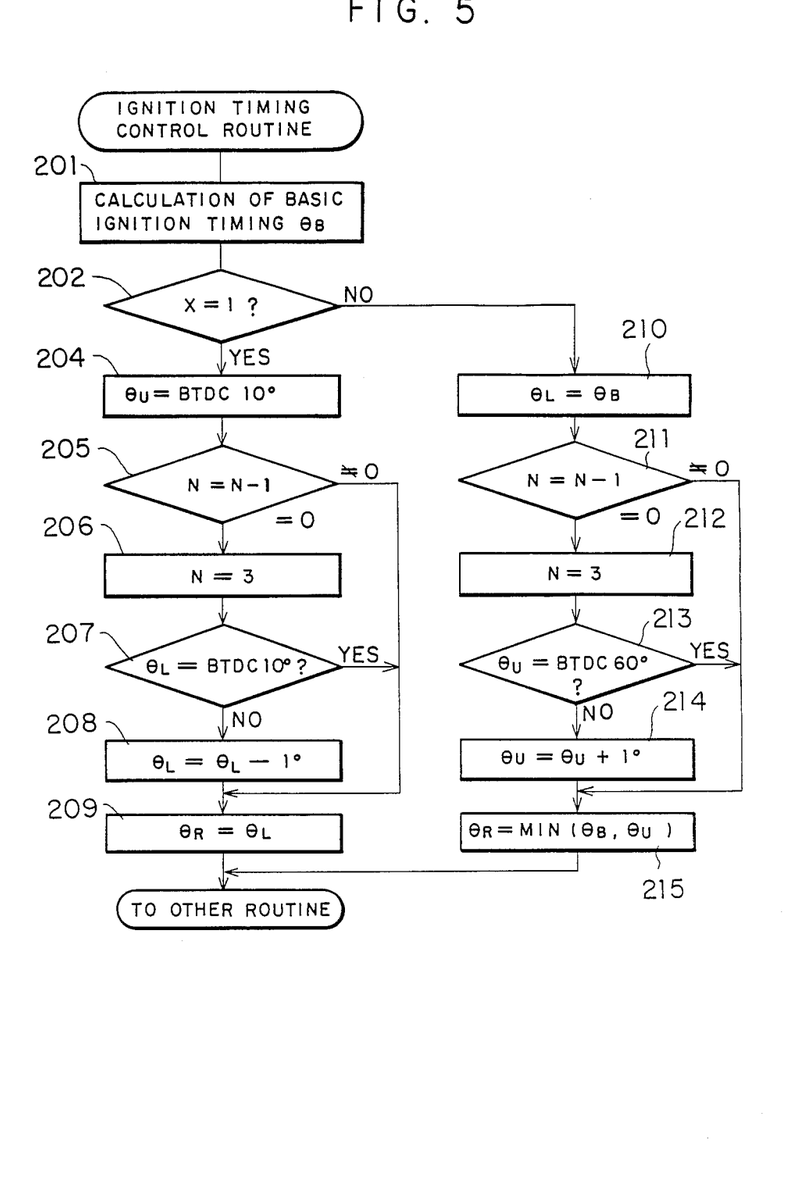

Subsequently, the ignition timing control processing shown in FIG. 5 is performed by each rotation of the engine 1 on the basis of a result of decision on the slow-speed hunting mode in FIG. 4. First, at Step 201, the basic ignition timing $\theta B$ is calculated from the intake pipe pressure and the number of revolutions, and at Step 202 a decision is made on whether or not the engine is the slow-speed mode. In the case of the slow-speed mode, the upper limit of the ignition timing $\theta U$ is set to 10° BTDC at Step 204. At Step 205, "1" is subtracted from the counter N and a decision is made whether or not N is 0. When the engine has made three revolutions, a counter 11 is set to N to count the following three revolutions at Step 206. At Step 207, a decision is made on whether or not the lower limit of the ignition timing $\theta L$ is 10° BTDC. If not 10° BTDC, 1° of $\theta L$ is subtracted; thus $\theta L$ will be subtracted, every three revolutions, 1° each down to 10° BTDC, and at Step 209, $\theta L$ is stored to the ignition timing $\theta R$. When, at Step 205, N is not 0, or when, at Step 207, $\theta L$ is 10° BTDC, Step 207 will be executed without subtracting 1° of $\theta L$.

On the other hand, when, at Step 202, the engine is not in the slow-speed mode, basic ignition timing $\theta B$ will be stored to the lower limit of the ignition tming $\theta L$ at Step 210. At Step 211, a similar decision as Step 205 is made. When the engine has made three revolutions, the counter N is set to 3 at Step 212. At Step 213, a decision is made on whether or not the upper limit of the ignition timing $\theta U$ is 60° BTDC; if $\theta U$ is not 60° BTDC, the upper limit of ignition timing $\theta U$ is increased 1° up at Step 214 to gradually increase $\theta U$ up to 60° BTDC by 1° per three revolutions. At Step 215, the smaller one of the basic ignition timing $\theta B$ and the upper limit of ignition timing $\theta U$ is stored to $\theta R$. At Step 211, when N-1 is not 0, or when, at Step 213, $\theta U$ is 60° BTDC, the processing at Step 215 will be executed without increasing $\theta U$ by 1°. At Step 213, a decision is made to limit $\theta U$ by the maximum spark advance angle; the ignition timing is not particularly required to be 60° BTDC, but is simply required to be limited to over the maximum spark advance angle of $\theta B$ to be calculated at Step 201. The control circuit 25 controls a signal to be output to the igniter 19 by the ignition execution routine not illustrated.

Figure 6:
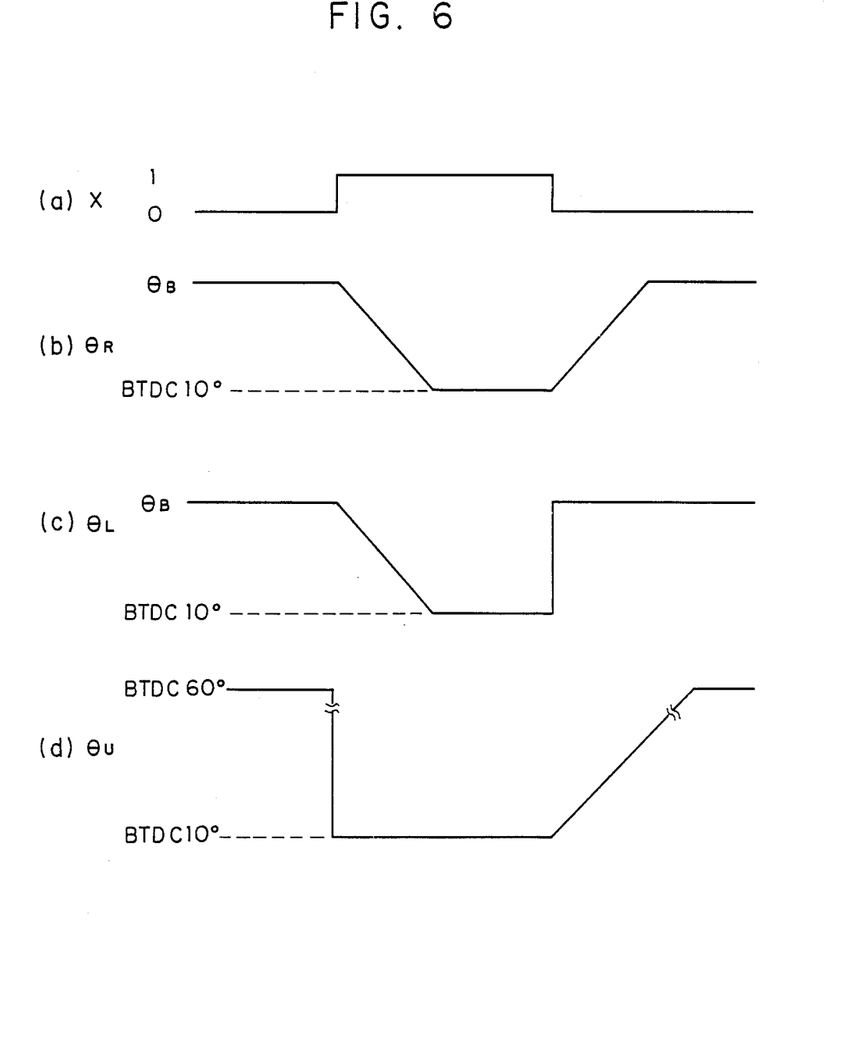

FIG. 6 shows a timing chart of the operation described above, indicating (a) flag X, (b) $\theta R$, (c) $\theta L$, and (d) $\theta U$. $\theta L$ will become $\theta B$ when X is 0; when flag X becomes 1, the ignition timing will retard by 1° per three revolutions of the engine 1, stopping at 10° BTDC; and while the flag X is 1, the ignition timing is 60° BTDC. $\theta U$ is set to 10° BTDC when the flag X becomes 1; and when the flag X changes from 1 to 0, the ignition timing varies toward the spark advance side by 1° per three revolutions of the engine 1, being held at 60° BTDC. Therefore, $\theta R$ will vary to a form of ramp when the flag X has changed from 0 to 1 or from 1 to 0.

In the embodiment described above, $\theta L$, $\theta U$ were changed per specific number of revolutions but may be changed per a specific time. Also, the ignition timing was changed to a form of ramp when entering and releasing the slow-speed mode, but may be changed in steps. Furthermore, when the engine is not in the slow-speed mode in FIG. 5, a measure against the slow-speed mode and acceleration correction will compatibly be established to obtain a good driving feeling by deciding the accelerating state of the engine by for example the amount of the throttle valve opening and executing such a processing, when in the accelerating state, that $\theta U$ will immediately become 60° BTDC.

According to this invention, as described above, a change is made from the first ignition timing to the second ignition timing when sensing the slow-speed hunting state, and also, at the time of this change, the ignition timing is gradually changed, such that a good driving feeling can be obtained without a shock when the ignition timing is changed.

What is claimed is:

1. An electronic control device for internal-combustion engines comprising a means for sensing the number of revolutions of engine; a means for sensing the speed of a motor vehicle; a means for sensing a loaded condition of engine; a control means for changing the ignition timing from a first ignition timing to a second ignition timing when the number of revolutions of engine is below a specific value, a vehicle speed is within a specific range, and when the loaded condition of engine is below a specific value; and an ignition timing change means for gradually changing the ignition timing at the time of at least one of a change from the first ignition timing to the second ignition timing and a chamge from the second ignition timing to the first ignition timing.

2. An electronic control device as claimed in claim 1, wherein said control means makes a change from the second ignition timing to the first ignition timing when at least one of the number of revolutions of engine and the loaded condition has exceeded a specific value.

3. An electronic control device as claimed in claim 1, wherein upper and lower limits of ignition timing are established and said igniton timing change means changes the upper and lower limits of the ignition timing per a specific number of revolutions.

4. An electronic control device as claimed in claim 1, wherein upper and lower limits of ignition timing are established and said ignition timing change means changes the upper and lower limits of the ignition timing per specific time.

5. An electronic control device as claimed in claim 1, wherein upper and lower limits of ignition timing are established and said ignition timing change means changes the upper and lower limits of the ignition timing into a form of ramp.

6. An electronic control device as claimed in claim 1, wherein upper and lower limits of ignition timing are established and said ignition timing change means changes one of the upper and lower limits of the ignition timing in steps.

7. An electronic control device as claimed in claim 1, wherein an upper limit of ignition timing is established and wherein an accelerating state of said engine, when not in the slow-speed mode, is decided by the amount of throttle valve opening, and in the accelerating state, the upper limit of the ignition timing is immediately set to 60° BTDC.

* * * * *

UNITED STATES PATENT AND TRADEMARK OFFICE
CERTIFICATE OF CORRECTION

PATENT NO.    : 4,854,285
DATED         : August 8, 1989
INVENTOR(S)   : YOSHIAKI KANNO ET AL.

It is certified that error appears in the above-identified patent and that said Letters Patent is hereby corrected as shown below:

```
Col. 1, line 11, "wth" should be --with--;
Col. 1, line 57, after "conditioner" insert --;--.

Col. 2, line 47, "is" should be --so--.

Col. 5, line 6, "chamge" should be --change--;
Col. 5, line 15, "igniton" should be --ignition--.
```

Signed and Sealed this

Sixth Day of November, 1990

Attest:

HARRY F. MANBECK, JR.

*Attesting Officer*  *Commissioner of Patents and Trademarks*